(12) United States Patent
Tran et al.

(10) Patent No.: US 9,483,095 B2
(45) Date of Patent: Nov. 1, 2016

(54) APPARATUS AND METHOD FOR PROVIDING A MODULAR POWER SUPPLY WITH MULTIPLE ADJUSTABLE OUTPUT VOLTAGES

(71) Applicant: Abbott Medical Optics Inc., Santa Ana, CA (US)

(72) Inventors: Tuan Tom Tran, Stanton, CA (US); Tony T. Doan, Garden Grove, CA (US)

(73) Assignee: Abbott Medical Optics Inc., Santa Ana, CA (US)

( * ) Notice: Subject to any disclaimer, the term of this patent is extended or adjusted under 35 U.S.C. 154(b) by 343 days.

(21) Appl. No.: 13/784,274

(22) Filed: Mar. 4, 2013

(65) Prior Publication Data

US 2014/0250317 A1   Sep. 4, 2014

(51) Int. Cl.
*G06F 1/32* (2006.01)
*G06F 1/26* (2006.01)
*G06F 1/30* (2006.01)

(52) U.S. Cl.
CPC ............ *G06F 1/266* (2013.01); *G06F 1/30* (2013.01); *G06F 1/3203* (2013.01)

(58) Field of Classification Search
CPC ........................................................ G06F 1/28
USPC ........................................................ 713/340
See application file for complete search history.

(56) References Cited

U.S. PATENT DOCUMENTS

| | | | | | |
|---|---|---|---|---|---|
| 5,881,215 | A | * | 3/1999 | Alft | G06F 11/2015 307/131 |
| 5,894,413 | A | * | 4/1999 | Ferguson | 363/65 |
| 5,936,318 | A | * | 8/1999 | Weiler | H02J 4/00 307/18 |
| 5,939,801 | A | * | 8/1999 | Bouffard | H02J 1/10 307/18 |
| 6,064,260 | A | * | 5/2000 | Montgomery | H03F 1/526 330/124 D |
| 6,181,029 | B1 | * | 1/2001 | Berglund | H02J 9/062 307/66 |
| 6,392,901 | B1 | * | 5/2002 | Colver | H05K 7/1457 312/223.2 |
| 7,058,835 | B1 | * | 6/2006 | Sullivan | G06F 1/30 713/300 |
| 7,212,102 | B1 | * | 5/2007 | Meitzen | G08B 29/181 340/333 |
| 7,834,486 | B1 | * | 11/2010 | Flegel | H02J 9/04 307/126 |
| 7,904,734 | B1 | * | 3/2011 | Singla | G06F 1/263 713/300 |
| 8,994,213 | B1 | * | 3/2015 | Czamara | H02J 9/062 307/64 |
| 2001/0005894 | A1 | * | 6/2001 | Fukui | G06F 1/26 713/310 |
| 2001/0019226 | A1 | * | 9/2001 | Ekelund | H02J 1/10 307/29 |
| 2002/0080575 | A1 | * | 6/2002 | Nam | G06F 1/184 361/679.47 |

(Continued)

*Primary Examiner* — Thomas Lee
*Assistant Examiner* — Volvick Derose
(74) *Attorney, Agent, or Firm* — Abbott Medical Optics Inc.

(57) ABSTRACT

An apparatus and method for supplying operating voltages to a plurality of electronic devices is disclosed. A plurality of power supply modules of a modular power supply may output voltages to at least two electronic devices. The apparatus may identify a failure of one of the power supply modules. The electronic device may be disconnected from the failed power supply module, and then reconnected to a functional power supply module of the modular power supply. A supplied voltage of the functional power supply module of the modular power supply may be varied, such as wherein the supplied voltage matches the set output voltage of the failed power supply module.

22 Claims, 8 Drawing Sheets

(56) References Cited

U.S. PATENT DOCUMENTS

| | | | | |
|---|---|---|---|---|
| 2002/0171295 A1* | 11/2002 | Nitta | G06F 1/28 | 307/64 |
| 2004/0228087 A1* | 11/2004 | Coglitore | G06F 1/189 | 361/679.46 |
| 2005/0141154 A1* | 6/2005 | Consadori | H02J 3/005 | 361/62 |
| 2005/0172157 A1* | 8/2005 | Artman | G06F 1/30 | 713/300 |
| 2008/0088186 A1* | 4/2008 | Hammond | H02M 7/49 | 307/125 |
| 2008/0164759 A1* | 7/2008 | Sharma | H02J 1/10 | 307/52 |
| 2008/0258556 A1* | 10/2008 | Ewing | H02J 9/06 | 307/23 |
| 2010/0019575 A1* | 1/2010 | Verges | H02J 3/14 | 307/38 |
| 2010/0164292 A1* | 7/2010 | Freeman | G06F 1/263 | 307/80 |
| 2011/0006603 A1* | 1/2011 | Robinson | G06F 1/263 | 307/31 |
| 2011/0068625 A1* | 3/2011 | Duan | G06F 11/2015 | 307/29 |
| 2011/0095608 A1* | 4/2011 | Jonsson | G01D 4/002 | 307/39 |
| 2011/0102996 A1* | 5/2011 | Janick | G06F 1/26 | 361/679.31 |
| 2012/0050928 A1* | 3/2012 | Johnson, Jr. | H02H 9/025 | 361/58 |
| 2012/0117408 A1* | 5/2012 | Takahashi | H02J 9/06 | 713/330 |
| 2012/0181869 A1* | 7/2012 | Chapel | H02J 9/06 | 307/64 |
| 2013/0020872 A1* | 1/2013 | Kinnard | H02J 9/061 | 307/64 |
| 2013/0198553 A1* | 8/2013 | Oguro | G06F 1/305 | 713/340 |
| 2013/0342968 A1* | 12/2013 | Peterson | H05K 7/1457 | 361/622 |
| 2014/0300192 A1* | 10/2014 | Price | G06F 1/26 | 307/53 |

* cited by examiner

APPARATUS AND METHOD FOR PROVIDING A MODULAR POWER SUPPLY WITH MULTIPLE ADJUSTABLE OUTPUT VOLTAGES

FIELD OF THE INVENTION

The instant disclosure relates to power supplies, and, more particularly, to an apparatus and method for providing a modular power supply with multiple adjustable output voltages.

BACKGROUND OF THE INVENTION

Electronic appliances, devices, computers and computer peripherals are becoming smaller and more portable every day. Many of these types of equipment are powered by an external power supply that provides a DC voltage source, which may or may not be internally converted within the device to one or more different DC voltage levels for use by the various internal electronic circuits and/or modules. These external power supplies are generally heavy, bulky blocks that provide a male plug for connecting to an AC outlet from one side of the block and a long cord terminated by a female plug for connecting to the equipment to be powered from the other side of the block.

Some environments may consist of many different electronic appliances, all of which need to be powered by a DC voltage source. One such environment, an operating room at a medical facility, may have many different types of medical and/or surgical equipment. Providing a unique power supply for each piece of medical equipment in the room is redundant to the extent that each power supply must duplicate several common circuit components. Such an approach to powering various pieces of medical equipment wastes valuable user workspace, generates excessive heat, increases the likelihood of AC or DC power failure(s), and increases the likelihood of power supply produced electrical interference within the room with sensitive medical devices. Further, interconnecting or cabling the various bulky supplies and equipment may interfere with the surgical space.

There are few more critical applications for power supplies to electronic equipment than the field of medical electronics. Lives may depend upon the reliable operation of medical equipment. In the unfortunate event that a medical device or power supply module fails, there may usually not be enough time to locate and replace a power supply device before a patient is negatively affected.

Accordingly, there is a need for a modular power supply capable of powering multiple electronic devices, whereby failed power modules can be rapidly replaced with functional modules to allow for sustained operation of electronic devices, particularly in a surgical setting.

SUMMARY OF THE INVENTION

An apparatus and method for supplying operating voltages to a plurality of electronic devices is disclosed. A plurality of power supply modules of a modular power supply may output voltages to at least two electronic devices. The apparatus may identify, or may allow for identification of, a failure of one of the power supply modules. The electronic device may be disconnected from the failed power supply module, and then reconnected to a functional power supply module of the modular power supply. If necessary, a supplied voltage of the functional power supply module may be switched to match the required voltage of the failed power supply module.

Accordingly, the present invention provides a modular power supply capable of powering multiple electronic devices and increasing an overall reliability of the power supplied by sharing the load requirements among a plurality of power supply modules. Additionally, the modular architecture enhances the flexibility of the power supply by allowing individual supplies to be modularly replaced and/or power supplied to be varied to accommodate changes in the power supply requirements.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts, and wherein.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for the purpose of clarity, many other elements found in typical power supplies and medical and surgical devices. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Embodiments of the present disclosure employ a power supply, such as a modular output power supply wherein each module may have multiple adjustable output voltages, to provide a robust apparatus whereby failed modules can be rapidly remedied with replacement modules without having to replace an entire power supply.

Figure 1:
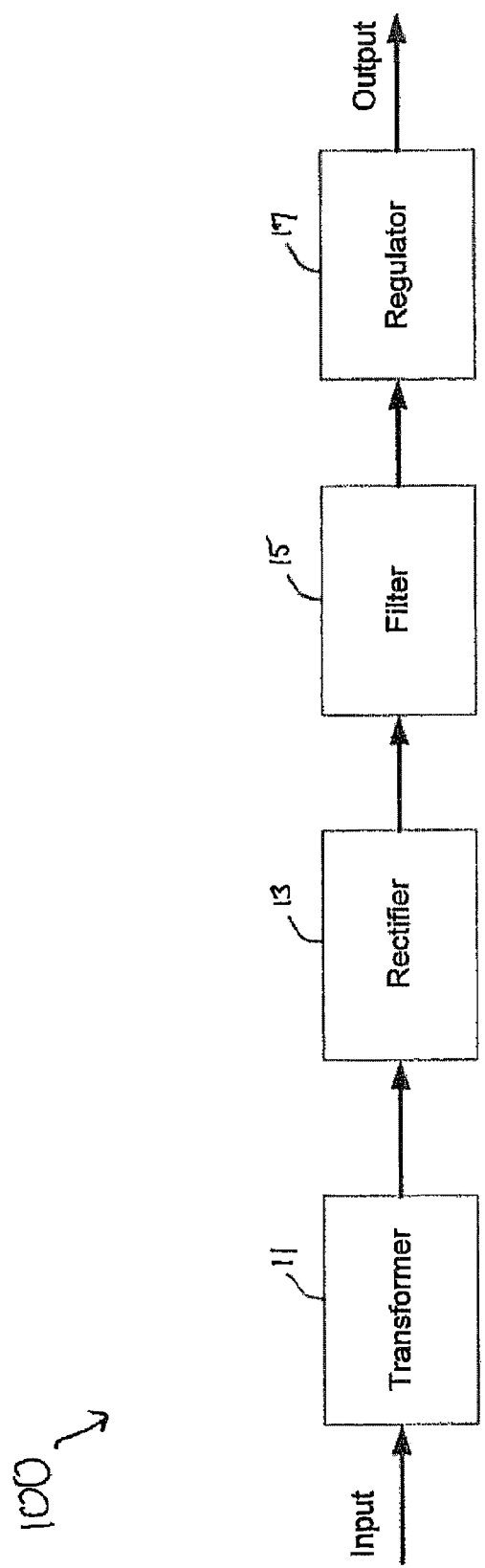
FIG. 1 illustrates a diagram of a basic power supply.

FIG. 1 is a diagram of a basic power supply 100, which includes a transformer 11, rectifier 13, filter 15, and regulator 17. The transformer serves two primary purposes: (1) to step up or step down the input alternating current (AC) voltage to the desired level; and (2) to couple this stepped voltage to the rectifier 13. The rectifier 13 converts the AC voltage to a pulsating direct current (DC) voltage. The DC voltage is then converted by the filter 15 to a filtered DC voltage.

Finally, as the name implies, the regulator 17 maintains the output of the power supply at a constant level in spite of changes in load current or in input line voltage.

It is not uncommon to have many electronic appliances in one environment needing to be supplied power, some of which may require power at similar times. Providing an independent power supply for each piece of electronic equipment in a room is redundant to the extent that each power supply must duplicate several common circuit components. Such an approach to powering various pieces of equipment wastes valuable user workspace, generates excessive heat, increases the number of components that may fail, and increases the likelihood of power supply produced electrical interference within the room and other sensitive devices.

According to the disclosure, a power supply may thus take the form of a modular power supply which may allow multiple devices to be powered by one power supply. The modular power supply may include a series of modules, each comprised of one or more ports, wherein each module may provide varying power to a connected device. The modular power supply of embodiments of the present invention also offers the ability to remove unused connections and the correspondent power supplies from a workspace. This reduces clutter and removes the risk of dangling cables interfering with other components. For example, a medical and/or surgical environment may contain many subsystems and devices, each needing to be supplied with power from a DC power supply.

Figure 2A:
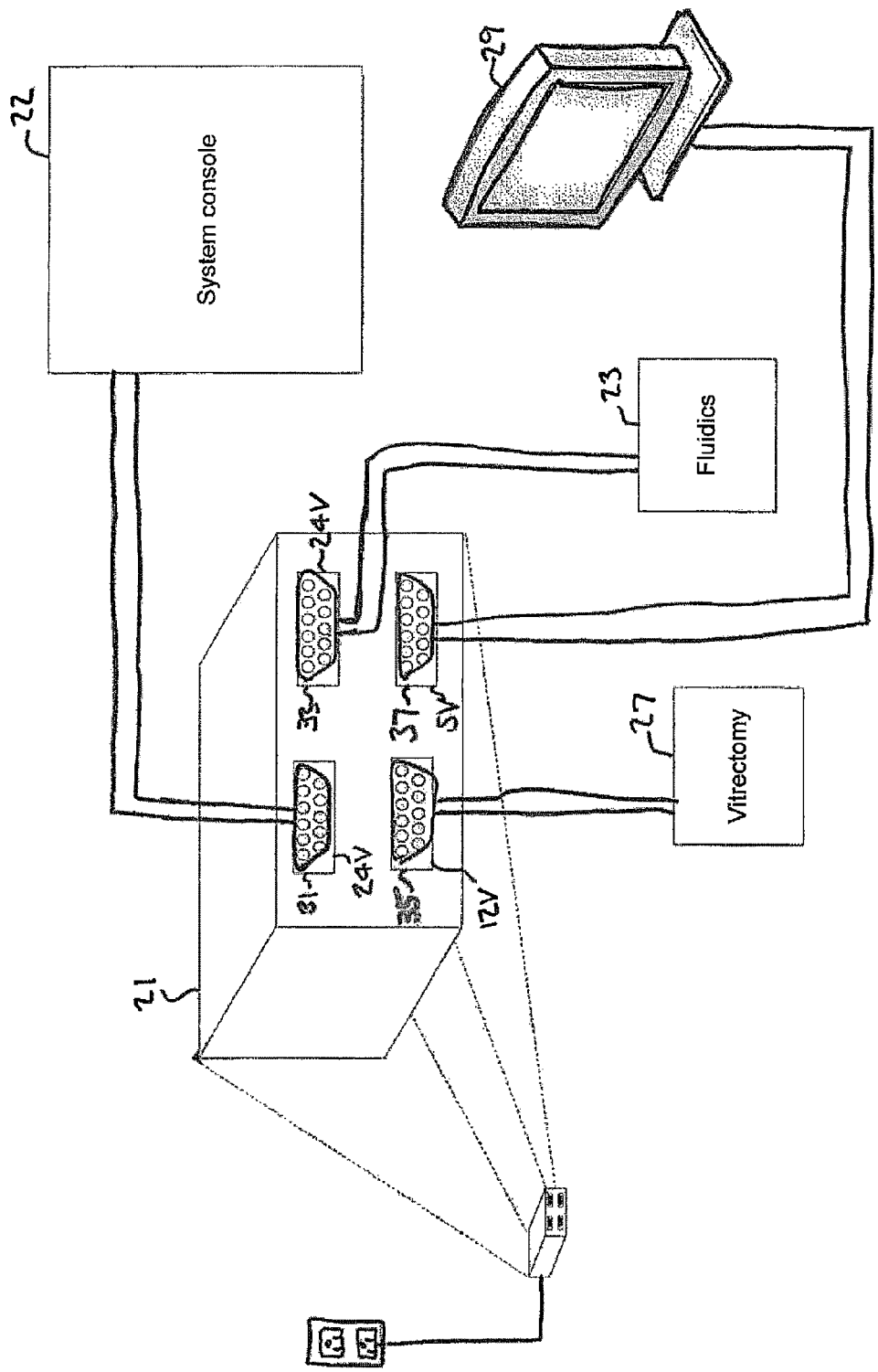
FIGS. 2A and 2B illustrate examples of modular power supply arrangements for providing operating voltages to pieces of medical equipment.

As shown in FIG. 2A, for example, devices in a surgical environment may include, among many other exemplary devices with which may be attached or connected through a phacoemulsification system console 22: a fluidics system 23; vitrectomy system 27; and a display monitor 29; all of which need power to operate. Each of these devices 22, 23, 27, and 29 may be connected to respective power supply modules 31, 33, 35, and 37 of modular power supply 21, rather than each device being connected to its own power supply. The respective power supply modules 31, 33, 35, and 37 may each supply variable, and thus possibly different, DC voltages to sufficiently power the respective devices 23, 25, 27, and 29 for operation. It should be noted that the power supply may contain any number of modules to support any number and type of phaco system devices and accessories. For example, in addition to, or in lieu of, the aforementioned devices, the modular power supply 21 may include modules to supply power to an ultrasonic handpiece, footpedal, intravenous (IV) poles, diathermy system, and the like.

For example, as shown, module 31 supplies 24 VDC to the system console 22, module 33 supplies 24 VDC to the fluidics device 23, module 35 supplies 12 VDC to the vitrectomy device 27, and module 37 supplies 5 VDC to the display monitor 29. As mentioned above, for the sake of simplicity, the modular power supply as shown in FIG. 2A comprises four power supply modules. However, the modular power supply 21 may contain any number of modules, as will be appreciated by one or ordinary skill in the art in view of the discussion herein.

Figure 2B:
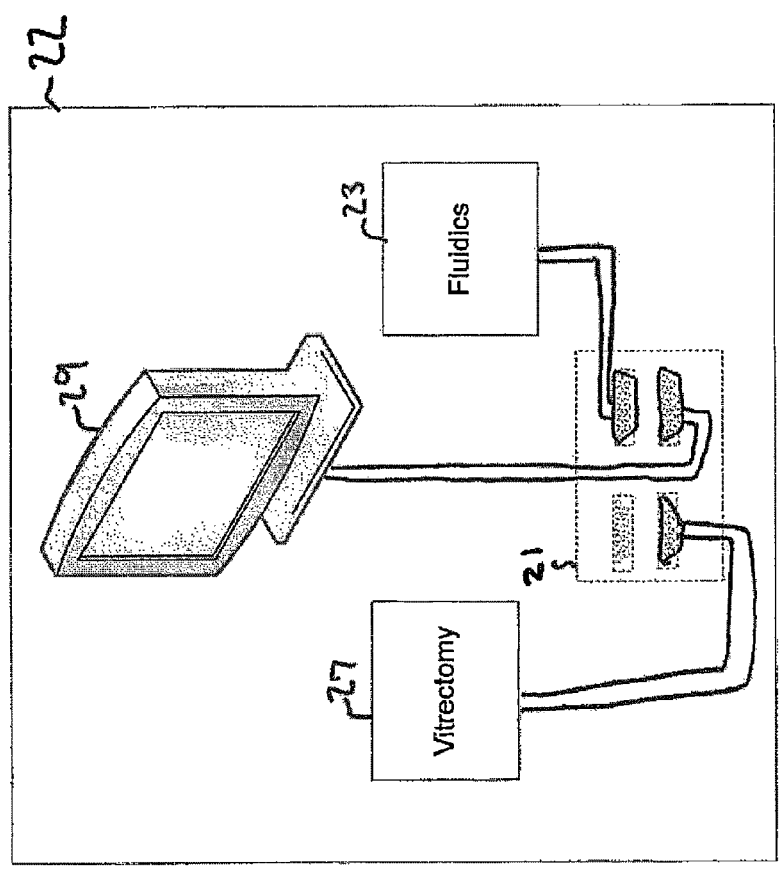

Many other configurations of the modular power supply and phaco system devices may be employed. For example, any number of the phaco system devices may be attached or located within the system console 22. As another example, the modular power supply may be internal to any of the phaco system devices and/or console. For example, as shown in FIG. 2B, the modular power supply 21 may be located internal to the system console 22. For example, the fluidics module 23 may be located within the console 22 and exposed to the exterior so as to allow an associated cassette (not shown) external to the console 22 to be loaded into the fluidics module 23. Further, different system devices 23, 27, and 29 may be affixed to the system console 22, such as, for example, in the WHITESTAR Signature System. As such, the power supply modules 31, 33, 35, and 37 may be available to that which these system devices 22, 23, 27, and 29 can connect and be supplied power.

In view of the above, a footpedal, an IV pole, a display monitor, and an ultrasonic handpiece may currently be connected to the modular power supply 21 located in system console 22, with the footpedal, display monitor and ultrasonic handpiece currently in use. In the unlikely event that the module associated with the footpedal malfunctions, an operator of the system may unplug the footpedal from the now malfunctioning module, unplug the IV pole from the functioning module to which it was connected (because the IV pole is currently not in use), and quickly plug the footpedal into the module to that which the IV pole was previously connected.

In use, prior known power supplies often fail, and it is difficult to repair/replace the power supply without turning off power to all voltages supplied, or at least without disconnecting a group of voltages supplied. Especially in medical environments, it is preferable to restore the power supply as quickly as possible with minimal time of power loss to the equipment. However, due to unique power (and voltage) requirements of different electronic devices, and set voltage characteristics of prior multi-voltage power supplies, it may take considerable time to repair/replace the failed power supply. For example, each port of a prior multi-voltage supply may supply a particular voltage. For example, as discussed above with respect to FIG. 2, module 37, were it "locked" to supply only a single voltage, would supply a DC voltage of 12 volts. In the unfortunate event that module 37 failed (e.g., short-circuit occurs), the 12V supply would need to be replaced/repaired. Module 37 would need to be replaced with another module with similar characteristics (e.g., the ability to supply 12 volts and a required current). Because the other modules would be "set" to supply only a single voltage in the known art, unless an individual (e.g., technician) fortuitously keeps spare 12V power supplies of identical characteristics on hand, the medical device associated with the failed 12V module will be inoperable for a period of time until a serviceman can be called to fix the failed module. Consequently, this delay may negatively impact a patient subject to the device, or an entire day or more of surgery.

As such, embodiments of the present disclosure employ a modular output power supply that may include modules having adjustable output voltages. Therefore, in the event one module fails, a different module within the modular power supply may be used, or swapped for the failed module, by simply varying the different module's voltage to match the voltage supplied by the failed module. Thereby, the failed module may be expediently replaced and, thus, minimizing the downtime of any device associated with the failed module.

Figure 3:
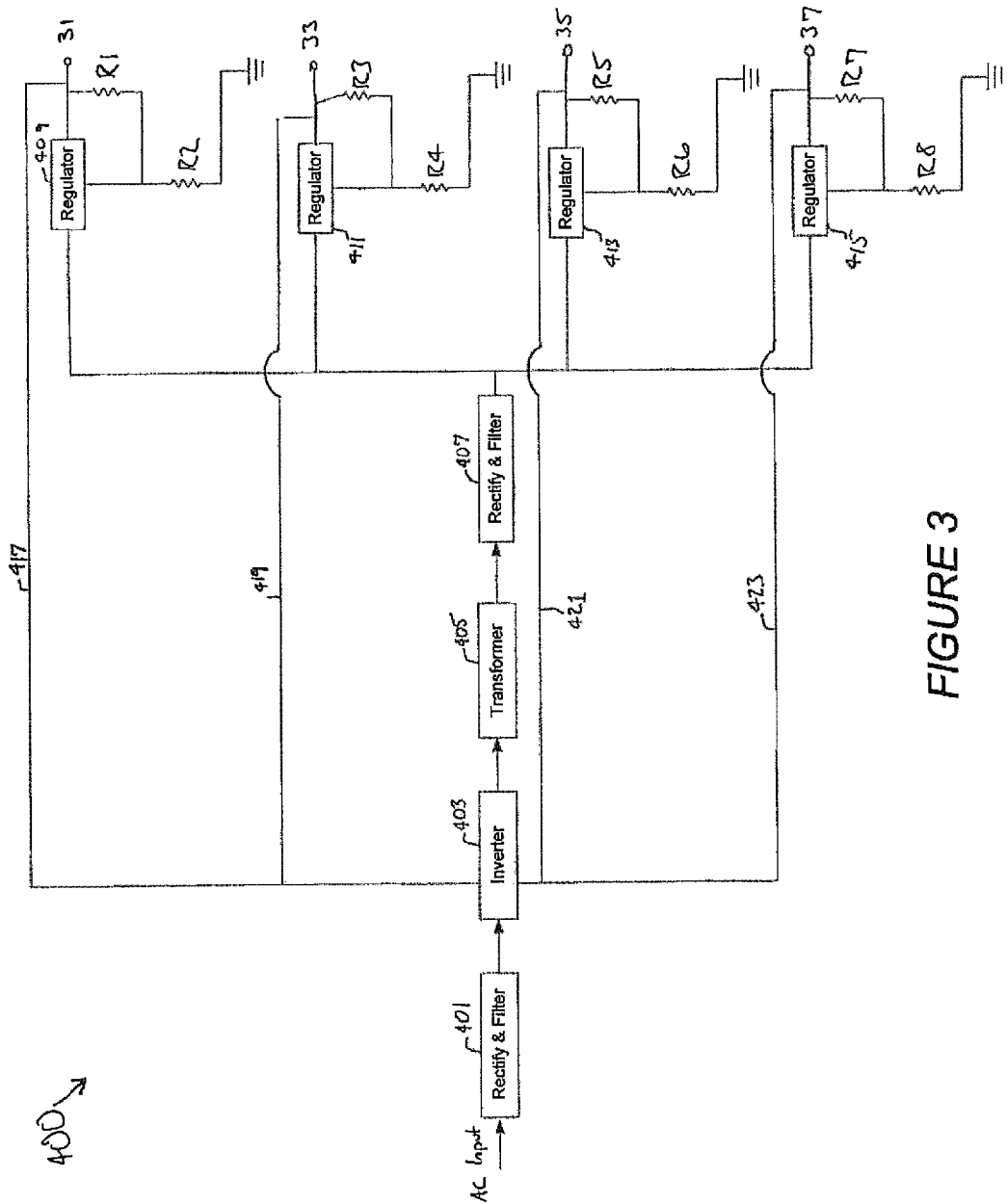
FIG. 3 illustrates a modular power supply circuit according to embodiments of the present disclosure.

FIG. 3 shows a block diagram of a modular output power supply circuit 400 according to embodiments of the invention. The power supply circuit converts AC power, for example from a wall socket, to DC power that may be used to power an electronic device. In the exemplary embodiment shown, there is one AC input and there are four DC output modules, although any suitable number of output modules may be provided. The power supply circuit includes an AC input line which provides an AC voltage (e.g., 100-240

VAC) to a rectifier with optional filter 401. The rectifier/filter 401 changes the AC input voltage to a DC output voltage (e.g., 50-120 VDC). The DC output voltage is then fed to an inverter 403, which generates an AC signal (e.g., 20 kHz at 50-120 VAC) that is stepped down in voltage by a transformer 405 (e.g., 20-60 VAC). The stepped-down AC voltage is then sent to another rectifier and optional filter combination 407, where the AC voltage is changed to a DC voltage (e.g., 25-60 VDC). The DC voltage is then fed to regulators 409, 411, 413, and 415, which produce output voltages at modules 31, 33, 35, and 37, respectively. Feedback lines 417, 419, 421, and 423 provide signals back to the inverter 403 to regulate the output voltages.

The respective output voltages at modules 31, 33, 35, and 37 may be varied according to embodiments of the present disclosure. By way of non-limiting example only, any number of the regulators 409, 411, 413, and 415 may take the form of a variable voltage regulator (for example LM317T from National Semiconductor), which may be capable of supplying 1.5 amps with a wide range of output voltages by using the ratio of two resistances, R1 and R2, R3 and R4, R5 and R6, or R7 and R8. In the event one module fails, the LM317T device has built in current limiting and thermal shutdown which makes it short-circuit proof, so as to not affect other currently connected modules.

Alternatively, if the LM317T is not employed, the power supply may employ a plurality of circuit-breakers or other electrical switches attached to each module and designed to isolate, to the extent possible, damage potentially caused to other modules in the power supply in the event of a module failure. Specifically, this protective feature may detect a fault condition and, by interrupting continuity, immediately discontinue electrical flow to the failed module. A user of the apparatus may further be alerted to a failed module by a series of light emitting diodes (LEDs) or similar signaling techniques, which visual signals may be connected to each module that may be configured to switch on or off upon failure of the respective module.

Figure 4:
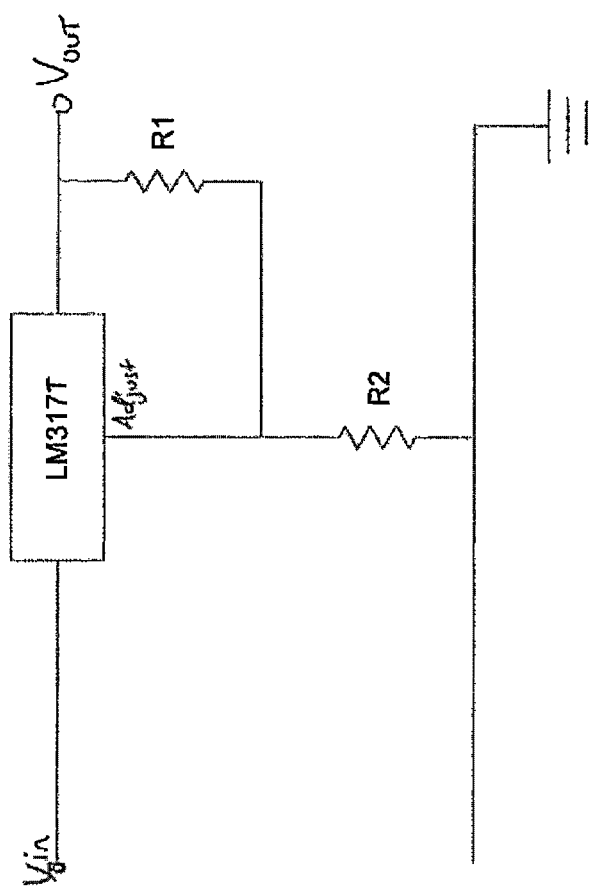
FIG. 4 illustrates a varying voltage regulator according to embodiments of the present disclosure.

As discussed above, an output voltage of the variable voltage regulator may be determined by a ratio of the two feedback resistors. These two resistors form a potential divider network across an output terminal, as shown in FIG. 4, and may be applied to module 31, for example.

The illustrative voltage across the feedback resistor R1 is a constant 1.25V reference voltage produced between the Output and Adjustment terminal. The adjustment terminal current is a constant current of 100 uA. Since the reference voltage across resistor R1 is constant, a constant current will flow through the other resistor R2, resulting in an output voltage of:

$$V_{OUT} = 1.25\left(1 + \frac{R_2}{R_1}\right)$$

The current that flows through resistor R1 also flows through resistor R2 (ignoring the very small adjustment terminal current), and the sum of the voltage drops across R1 and R2 is equal to the output voltage, Vout. The input voltage, Vin, must be at least 2.5V greater than the required output voltage. The LM317T, for example, has very good load regulation, provided that the minimum load current is greater than 10 mA. So, to maintain a constant reference voltage of 1.25V, the minimum value of feedback resistor R1 may be 1.25V/10 mA=120 ohms. This value may range anywhere from 120 ohms to 1,000 ohms, with typical values of R1 being 220 or 240 ohms.

Based on the known required output voltage, Vout, and the feedback resistor R1 of approximately 240 ohms, the value of resistor R2 may be calculated from the above equation. For example, an original output voltage of 9V would give a resistive value for R2 of: R1*((Vout/1.25)−1)=240*((9/1.25)−1)=1,488 ohms, or 1,500 ohms to the nearest preferred value, or 1.5 kΩ.

In practice, resistors R1 and R2, R3 and R4, R5 and R6, and/or R7 and R8 may be replaced by modular potentiometers, so as to produce a variable voltage power supply for each module, or by several switched, preset resistances. Further, the variable voltage may have a plurality of preferred "presets," i.e., wherein an adjustment knob may "click" into place correspondent to each of a plurality of available supplied voltages, or each variable voltage may be varied "continuously", such as over the full traverse of an adjustment knob. An exemplary variable voltage range may include, for example, 24V to +12V Dc. Additionally, for example, the varied voltages may be microprocessor controlled/enabled.

Figure 5:
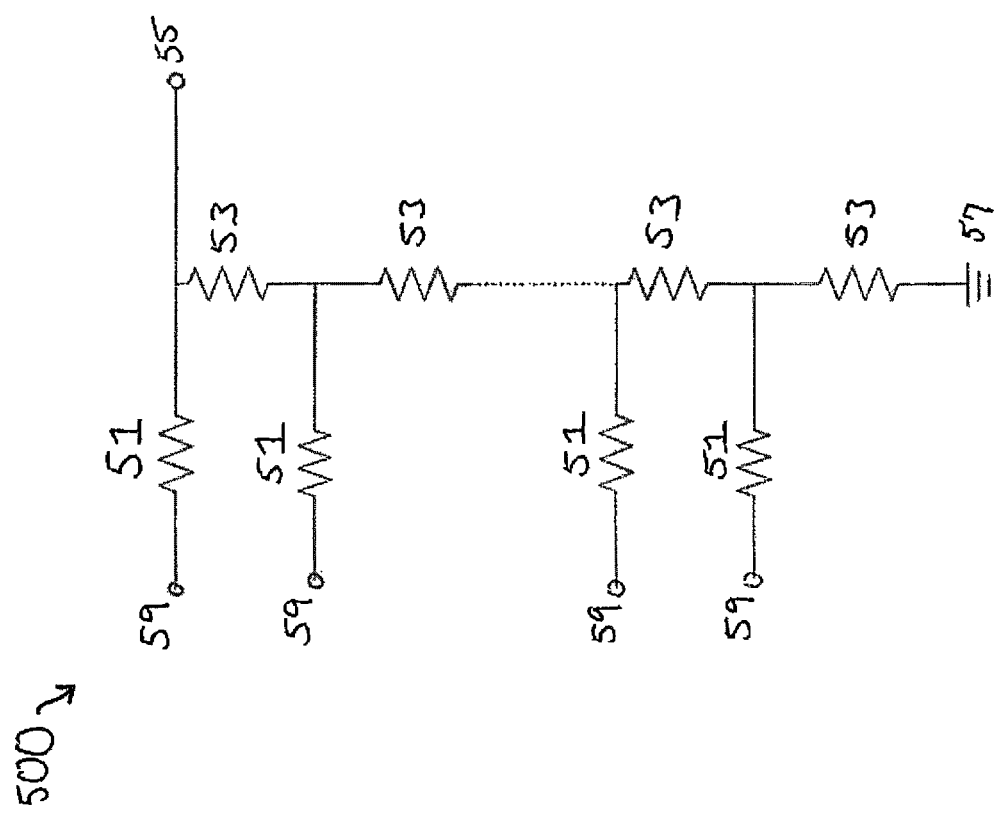
FIG. 5 illustrates a schematic diagram of an R-2R resistive ladder network according to embodiments of the present disclosure.

The output voltages may be varied by realizing a resistive ladder R-2R network, which may be programmable by a microprocessor. FIG. 5 illustrates a schematic diagram of the R-2R network 500. The R-2R network 500 is just one possible implementation of the above-discussed variable resistance. The R-2R network 500 includes a plurality of first resistor elements 51 (R1 for example) and a plurality of second resistor elements 53 (R2 for example). All first resistor elements 51 and one second resistor element 53 are serially interconnected between an output terminal 55 and the ground terminal 57. Each of the other second resistor elements 53 is connected between a coupling point of the series and one of a plurality of input terminals 59, respectively. The R-2R network 500 provides differing voltage levels with equidistant voltage steps.

In addition to employing a switch local to each module for power supply, embodiments of the present invention may employ a switch which may be controlled remotely through a wired, or wireless, port. Stated differently, a user may be able to remotely send a signal to a microprocessor communicatively connected to the power supply circuit, such as from a mobile device, for example, and thereby the user may be able to control the output voltages of each module.

Figure 6:
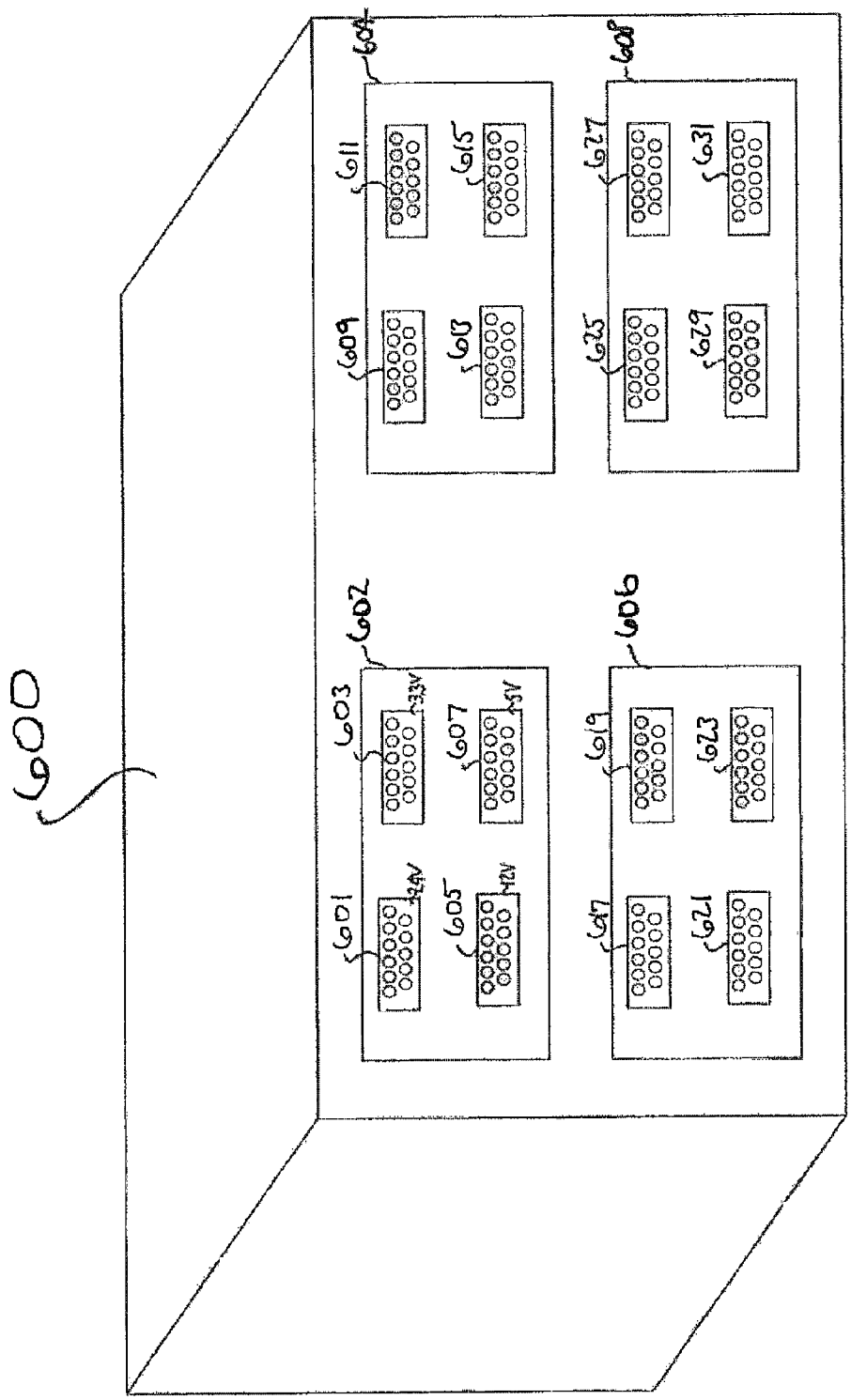
FIG. 6 illustrates a modular power supply having redundant module sets according to embodiments of the present disclosure.

In other embodiments of the present disclosure, an output voltage of each module may not need to be varied by any potentiometer, switched preset resistances, or any other resistance-switching means, but downtime may still be minimized. Specifically, rather than varying a voltage of a functioning module, a user may simply plug the electronic device into one of several different modules already set to output the voltage necessary to power the respective electronic device. This embodiment is particularly useful in the case of proprietary plugs for surgical devices. For example, FIG. 6 illustrates a modular power supply 600 having redundant modules 602, 604, 606, and 608. Any number of modules may be employed, however for the sake of simplicity, only four sets are shown. Each module 602, 604, 606, and 608 may contain discrete ports functioning in the same manner as power supply circuit 400 described in FIG. 4, but without the switch means. In other words, the resistor pairs may have fixed values, thus each module port provides a fixed output voltage. For example, from module 602, ports 601, 603, 605, and 607 supply fixed output voltages of 24V, 3.3V, 12V, and 5V respectively. Redundant modules 604, 606, and 608 may each have ports configured to supply the same fixed output voltages of module set 602. As a part of module 604, port 609 may supply 24V, port 611 may supply 3.3V, port 613 may supply 12V, and port 615 may supply 5V. Further, those skilled in the pertinent arts will appreciate, in light of the instant disclosure, that one or more of the ports per module may be constituted by the variable voltage port discussed hereinabove.

As such, if one module 601 (supplying 24 V) fails, the connected electronic device may be unplugged from that failed module 601 and plugged into module 609, which also supplies 24V. Therefore, different than power supply 40 discussed above, instead of switching the voltage of a module (for example, from 12V to 24V) to connect an electronic device previously connecting to a non-functional module, a user of power supply 600 may simply reconnect an electronic device to another module having a port already configured to output 24V to the electronic device. As such, no intermediate varying of voltages of individual modules may be necessary.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium, and preferably on a non-transitory computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 7:
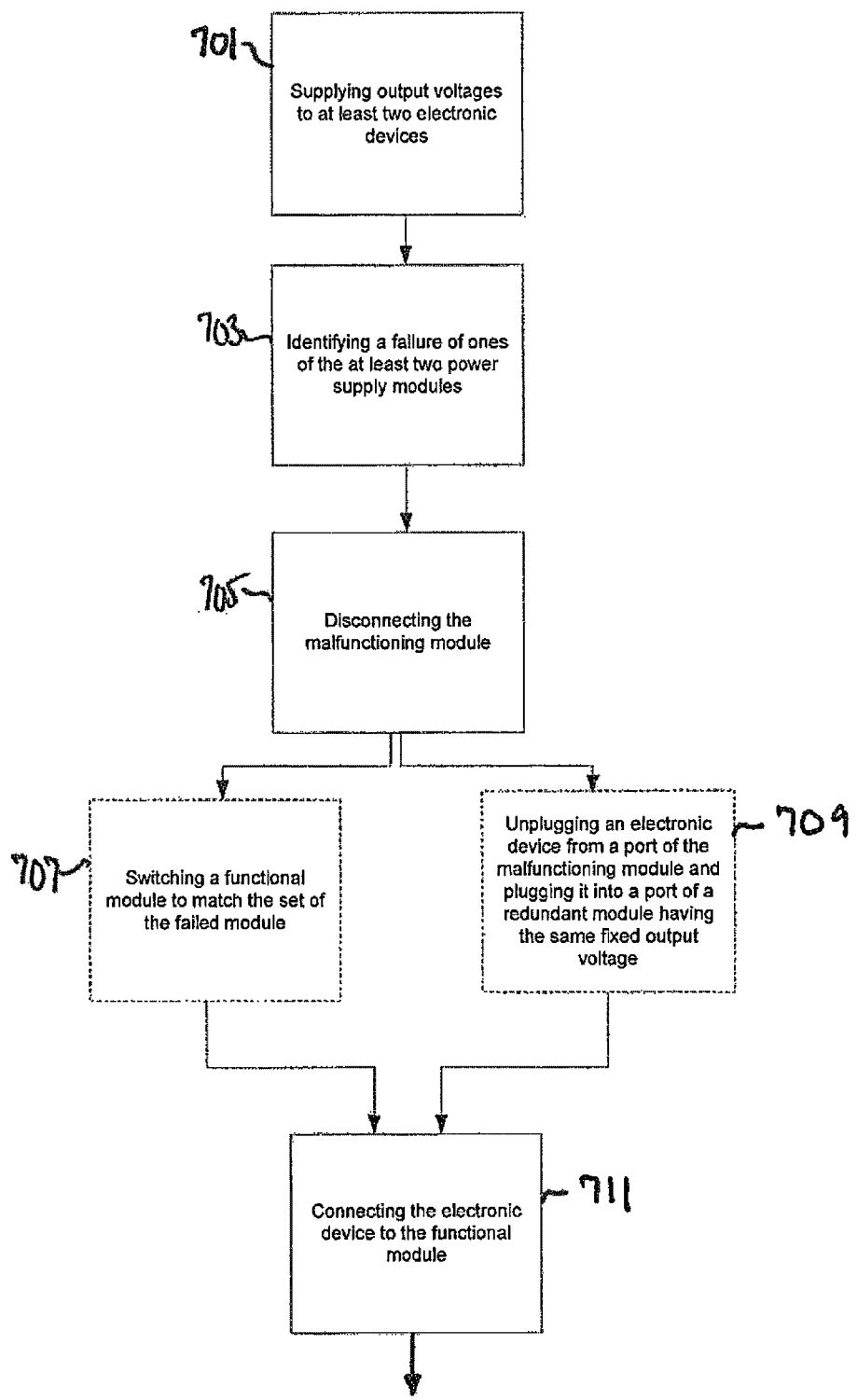
FIG. 7 illustrates a method of supplying operating voltages to a plurality of electronic devices.

FIG. 7 illustrates a method 700 for supplying operating voltages to a plurality of electronic devices. Method 700 may include, at step 701, supplying, by at least two power supply modules of a modular power supply, output voltages to at least two electronic devices. Method 700 may further include identifying a failure of one of the at least two power supply modules, at step 703. At step 705, the electronic device may be disconnected from the failed power supply module. Optionally, at step 707, a supplied voltage of a functional power supply module may (if necessary) be varied to match the set output voltage of the failed power supply module. Also optionally, at step 709, the electronic device may simply be unplugged from a port of a malfunctioning module and subsequently plugged into a port of a redundant module having the same fixed output voltage. Subsequently, at step 711, the electronic device may be connected to a functional power supply module of the modular supply.

Although the invention has been described and pictured in an exemplary form with a certain degree of particularity, it is understood that the present disclosure of the exemplary form has been made by way of example, and that numerous changes in the details of construction and combination and arrangement of parts and steps may be made without departing from the spirit and scope of the invention as set forth in the claims hereinafter.

The invention claimed is:

1. A method for supplying operating voltages to a plurality of electronic devices, the method comprising:
   supplying, by at least two power supply modules of a modular power supply, direct current (DC) output voltages to at least two electronic devices respectively, wherein the DC output voltages are derived from a single alternating current (AC) input to the modular power supply;
   sensing a failure of one of the at least two power supply modules;
   allowing for a disconnecting of the electronic device from the failed one of the power supply modules; and
   allowing for a connecting of the electronic device to a functional one of the power supply modules of the modular power supply, wherein the functional one of the power supply modules independently powers the electronic device.

2. The method of claim 1, further comprising:
   providing for a varying of a supplied voltage of the functional one of the power supply modules, wherein the varied voltage matches the set output voltage of the failed power supply module.

3. The method of claim 2, further comprising controlling the varying remotely.

4. The method of claim 1, wherein at least two of the supplied voltages are fixed.

5. The method of claim 1, wherein the sensing comprises identifying to a user, a failure of one of the at least two power supply modules.

6. The method of claim 1, wherein said allowing for a disconnecting and allowing for a connecting comprise providing at least one port in association with each of the power supply modules.

7. A modular power supply, comprising:
a plurality of power supply modules, each for supplying at least one direct current (DC) operating voltage derived from a single alternating current (AC) input to the modular power supply, and each of the power supply modules including:
a voltage switch configured to vary at least one of the operating voltage of the respective power supply module; and
a voltage regulator configured to regulate the at least one operating voltage, wherein the modular power supply is configured to:
allow for a disconnecting of an electronic device from a failed one of the power supply modules; and
allow for a connecting of the electronic device to a functional one of the power supply modules of the modular power supply, wherein the functional one of the power supply modules independently powers the electronic device.

8. The modular power supply of claim 7, wherein the voltage regulator comprises a varying voltage regulator.

9. The modular power supply of claim 7, wherein the voltage switch comprises a potentiometer.

10. The modular power supply of claim 7, wherein the voltage switch comprises a microprocessor-controlled variable resistance.

11. The modular power supply of claim 7, wherein the voltage switch comprises a resistive ladder.

12. The modular power supply of claim 7, wherein at least two of the plurality of power supply modules are suitable to supply the same one of the at least one operating voltage.

13. The modular power supply of claim 7, further comprising at least one port associated with each module, wherein each of the at least one ports is suitable to supply the at least one operating voltage.

14. The modular power supply of claim 13, wherein at least one of the ports comprises a proprietary plug.

15. The modular power supply of claim 7, further comprising a module failure indicator capable of indicating a failure of at least one of the plurality of power supply modules.

16. The modular power supply of claim 15, wherein the module failure indicator comprises one of an audible and a visual indicator.

17. The modular power supply of claim 16, wherein the visual indicator comprises at least one light switching diode.

18. The modular power supply of claim 7, wherein the voltage switch is controlled remotely.

19. A computer-program product, comprising:
a non-transitory computer-readable medium comprising code for causing a computer to:
supply, from at least two power supply modules of a modular power supply, direct current (DC) output voltages to at least two electronic devices, wherein the DC output voltages are derived from a single alternative current (AC) input to the modular power supply;
identify a failure of ones of the at least two power supply modules;
disconnect the electronic device from the failed power supply module; and
connect the electronic device to a functional power supply module of the modular power supply, wherein the functional power supply module independently powers the electronic device.

20. The product of claim 19, wherein the non-transitory computer-readable medium further comprises code to vary a supplied voltage of the functional power supply module of the modular power supply, wherein the supplied voltage matches the set output voltage of the failed power supply module.

21. The product of claim 19, wherein the disconnecting and connecting occurs via automated switching.

22. The product of claim 19, wherein the supplied voltages are fixed.

* * * * *